Nov. 15, 1927.

H. R. TRAPHAGEN

POLE TRUCK

Filed Jan. 9, 1926

Nov. 15, 1927.
H. R. TRAPHAGEN
POLE TRUCK
Filed Jan. 9, 1926
1,649,757
2 Sheets-Sheet 2
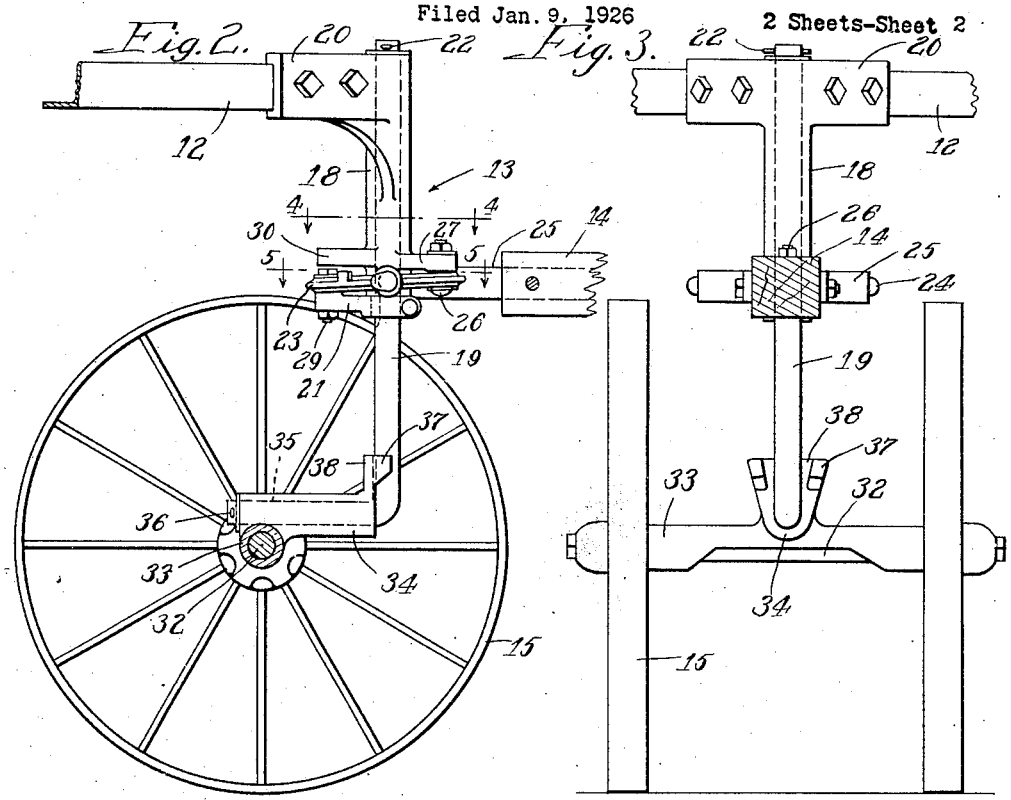
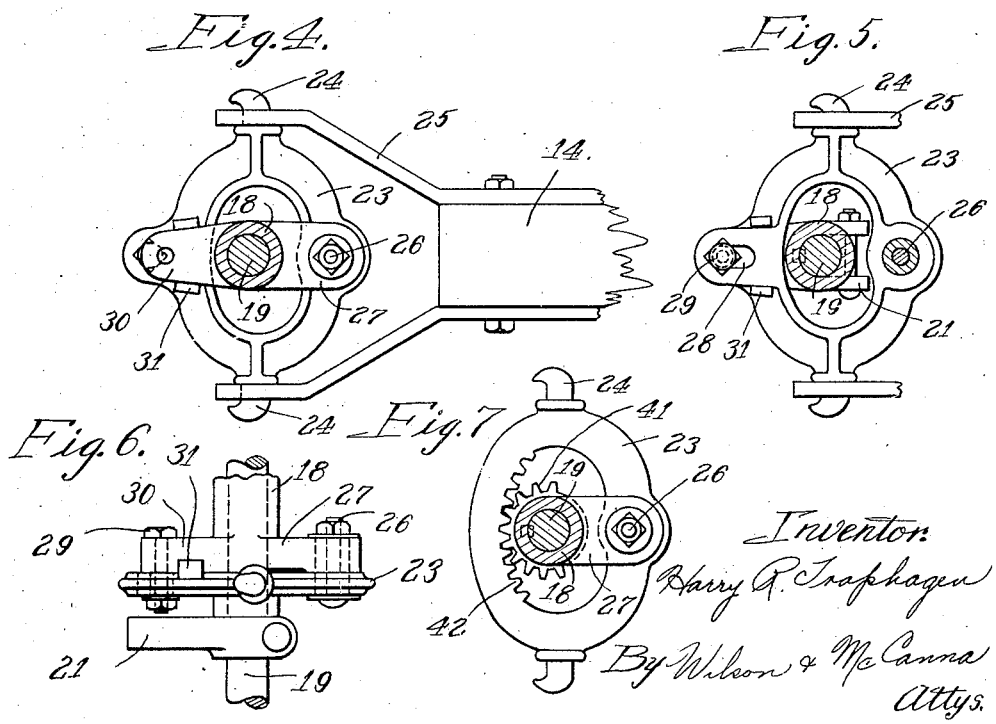
Inventor:
Harry R. Traphagen
By Wilson & McCanna
Attys.

Patented Nov. 15, 1927.

1,649,757

UNITED STATES PATENT OFFICE.

HARRY R. TRAPHAGEN, OF ROCKFORD, ILLINOIS, ASSIGNOR TO EMERSON-BRANTINGHAM CORPORATION, OF ROCKFORD, ILLINOIS, A CORPORATION OF ILLINOIS.

POLE TRUCK.

Application filed January 9, 1926. Serial No. 80,252.

This invention relates to farm implements generally and more particularly to improvements in pole or tongue trucks such as are used on cultivators, mowers, and other implements.

The principal object of the invention is to provide a pole truck enabling quick turns without discomfort to the horses due to a sawing or whipping action of the pole or because of the implement running against the flanks of the horses.

According to the present invention, I provide a pole truck avoiding neck weight on the horses and keeping the pole at the proper height which has a steering connection with the pole for turning the truck wheels faster than the pole thus making square turns possible and enabling accurate reversing of the implement from one course to the next adjacent return course by the pivoting of the implement on one of its wheels, as in the case of two-row cultivators, for example.

A further object of the invention is to provide a pole truck which may be connected with the pole in either of two fashions to operate as a free caster or have a differential steering connection with the pole to be turned faster than the pole.

The invention is pointed out more fully in the following specification wherein reference is made to the accompanying drawings, in which—

Fig. 2 is a side view of the pole truck, portions of which are broken away more clearly to illustrate the features thereof;

Fig. 3 is a front view of Fig. 2;

Fig. 4 is a horizontal section on the line 4—4 of Fig. 2 showing the steering connection for the pole truck in plan;

Fig. 5 is a similar section taken on the line 5—5 of Fig. 2;

Fig. 6 is a side view of the steering connection with the parts altered from the relationship shown in Figs. 2 to 5 to enable the wheels to caster; and Fig. 7 is a view similar to Fig. 4 showing an alternative form of steering connection.

Throughout the views similar reference numerals are applied to corresponding parts.

Figure 1:
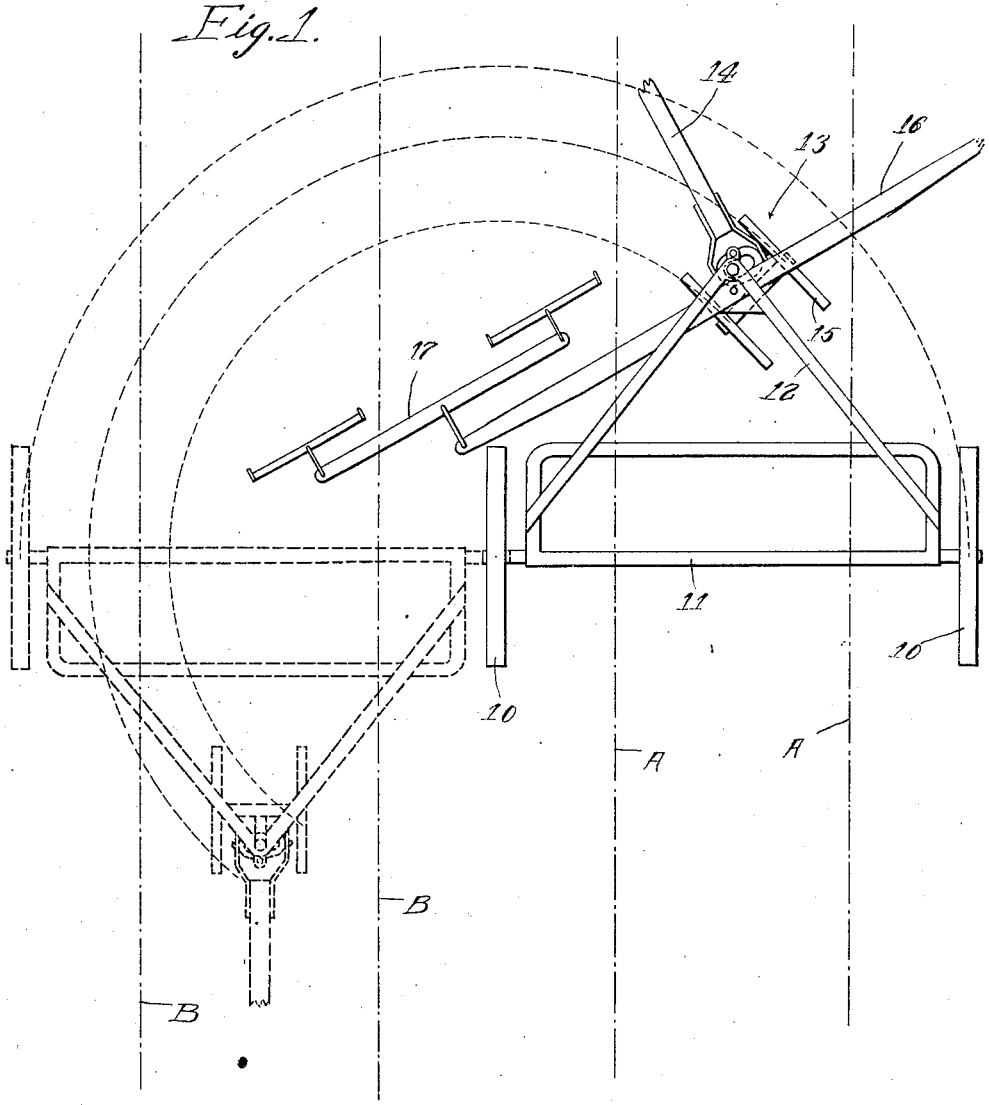
Figure 1 is a diagrammatic plan view of an implement such as a two-row cultivator equipped with my improved pole truck showing how the implement may be pivoted on one of its wheels at the end of one course in reversing the implement to return on the next course while maintaining the proper relationship with the two courses.

My invention is at present shown embodied in a two-row cultivator having the main steering and carrying wheels 10 on a main frame 11. A pole truck frame 12 extends forwardly from the frame 11 over a pivot wheel pole truck, designated generally by the numeral 13, having connection with a steering pole 14. It will be apparent that the pole 14 in certain implements might be made to serve for draft purposes. A single pole is shown in the present case although in cultivators of this kind it is also customary to use double poles. It will also be remarked that a pair of wheels 15 are shown employed on the pole truck 13. In some cases, only a single wheel is used. An evener bar 16 is pivotally mounted in the frame 12 and carries double-trees 17 at opposite ends on either side of the pole 14. The matter thus far described is more or less completely shown in my copending application, Serial No. 14,895 filed March 12, 1925. My improved pole truck to which the present case relates in particular appears in the said application and is therein referred to.

The pole truck 13 comprises a front casing providing a sleeve 18 for the upright axle 19 of the pole truck and diverging arms 20 bolted as shown to the pole truck frame 12. A crank arm 21 is keyed and bolted to the upright axle 19 and abuts against the lower end of the sleeve 18, as shown. A cotter pin 22 and washer are provided at the upper end of the axle 19 to hold the parts together. A yoke 23 generally of elliptical or oval form surrounds the sleeve 18 and has trunnions 24 at diametrically opposite sides thereof on its major axis having pivotal connection with brackets 25 bolted to the end of the pole 14. The yoke 23 is pivoted as by means of a bolt 26 on an offset provided by an arm 27 rigid with and extending from the forward side of the sleeve 18. The pivotal connection at 26, as shown in Figs. 4 and 5, is approximately midway between the trunnions 24 on the minor axis of the yoke 23. At the diametrically opposite side of the yoke from the pivotal connection 26, the yoke is slotted as shown at 28 to receive a bolt 29 for attaching the yoke either to the outer end of the crank arm 21 or to the outer end of a rigid arm 30 forming an integral offset on the sleeve 18 opposite the arm 27, previously mentioned. In Figs. 2 to 5, the yoke is shown connected with the crank arm 21 while in Fig. 6 it is shown connected rigidly with the arm 30. In the latter case, it will be apparent that the crank arm 21 is perfectly free with the axle 19 so that the wheels 15 are free to caster. The pole 14 with the yoke 23 is rigid with the frame 12 by virtue of the bolt connections at 26 and 29. A pair of upstanding lugs 31 are provided on the yoke 23 to embrace the opposite sides of the arm 30 and positively locate the yoke in relation thereto while avoiding any shear on the bolt 29. The castering action is facilitated by the fact that the cross axle 32 for the wheels 15 is offset rearwardly from the upright axle 19. A sleeve 33 receiving the axle 32 has a bearing 34 at its mid point at right angles thereto receiving the offset lower end 35 of the axle 19. A cotter pin 36 and washer assemble the sleeve 33 by its bearing 34 on the lower end of the axle 19. The wheels 15 with the axle 32 are free to rock or oscillate laterally a limited amount determined by a pair of lugs 37 provided on a head 38 at the forward end of the bearing 34 at either side of the axle 19. This permits the wheels to roll smoothly and easily with all ground conditions and avoids side draft.

The steering connection for the pole 14 with the axle 19 through the medium of the yoke 23 arranges the pivotal connection of the pole with the implement eccentric with respect to the pivotal connection of the axle 19 with the implement. In other words, the pivot point 26 is off center relative to the axle 19, as will be evident particularly in Figs. 4 and 5. By virtue of this arrangement, the truck wheels are swung through a greater angle for a given angular movement of the pole, that is, they turn faster than the pole and facilitate quick turning. The maneuvering of the implement which is made possible with the present improvements is diagrammatically illustrated in Fig. 1. When the pole is straight forward, the wheels 15 are, of course, in trailing relation and aligned therewith, but the moment the pole is swung to either side in turning the implement about the truck wheels are swung faster, as clearly illustrated in Fig. 1, and a sharp turn is possible without any necessity for backing the horses against the implement. It will be noted that the evener 16 remains clear of the main wheels when the pole truck is swung to the limit of its movement. In that event, the wheels of the pole truck move in arcs with one of the main wheels 10 as a center. Thus, on the arrival of the implement at the end of the rows designated A, the implement may be turned about for the return course along the rows B and in making the turn whichever wheel is between the old rows and the fresh rows will act as a pivot and will not turn but swing about on a vertical axis. The swinging of the pole truck relative to the frame is limited by the ends of the yoke 23 adjacent the trunnions 24 coming into contact with the sleeve 18 in an obvious manner as the yoke swings about the pivot point 26. The obvious advantages in the use of the present invention are that the pole is always kept at the proper height and there is absolutely no whipping or sawing on the horse, necks in the maneuvering of the implement and neck weight is eliminated.

In the alternative structure shown in Fig. 7, the crank arm 21 is replaced by a gear sector 41 meshing on an internal rack 42 provided in the yoke 23. The gear 41, as indicated, is keyed and suitably fixed on the axle 19 and in the swinging of the yoke 23 about the pivot 26, the axle 19 is moved through a greater angle for a given angular movement of the yoke and hence of the pole 14 to which it is connected. The eccentric relationship of the pivotal connections 19 and 26 is maintained in this alternative construction and substantially the same operation is secured. Obviously the gear sector 41 may if desired be arranged by a splined connection with the axle 19 to be moved out of meshing engagement with the rack 42 to provide for the castering of the truck wheels and in that event a similar rigid connection of the yoke 23 with the pole truck frame 12 may be provided if desired.

It is believed that the foregoing conveys a clear understanding of the objects prefaced above, it being noted however, that the particular construction disclosed herein is for illustrative purpose merely, and that changes might be made in the construction and arrangement of parts without departing from the spirit and scope of the invention as expressed in the appended claims.

I claim:

1. A structure as set forth in claim 2 wherein one of the two last mentioned connections is a sliding pivotal connection.

2. In a wheeled implement, the combination of a pivoted steering wheel truck pivoted thereto at a certain point, a pole element pivotally connected to the implement eccentric to the first pivot point, and a crank for connecting said truck and pole having a pivotal connection with the pole at a point also eccentric to the first pivot but on the diametrically opposite side from the second pivot point.

3. In a wheeled implement, the combination of a pole truck frame, an upright axle pivoted therein, and having an operating crank, a steering pole pivoted on said frame eccentrically relative to said axle, means for alternatively pivotally connecting said pole with said axle operating crank for quickened steering or rigidly connecting the same with said frame so as to leave the axle free, and a steering wheel carried by said axle and arranged to caster with the axle when the pole is fastened rigidly to the frame.

4. In a wheeled implement, the combination of a pole truck frame, an upright axle pivoted therein and having an operating crank, a steering pole pivoted on said frame eccentrically relative to said axle, a single yoke part arranged for alternatively pivotally connecting said pole with said axle operating crank in a sliding pivotal connection or rigidly connecting the same with said frame, and a wheel carried by said axle and arranged to serve as a steering wheel when the yoke is connected with the axle crank and as a caster wheel otherwise.

5. In a wheeled implement, the combination of a pole truck frame, an upright axle pivoted therein, a steering pole, a cross axle offset relative to said upright axle and pivotally mounted thereon for lateral oscillation with respect thereto having a pair of steering wheels thereon, and means oscillating with said cross axle and arranged for engagement with either side of the upright axle for limiting the lateral oscillation of said cross axle with respect to said upright axle.

6. In a wheeled implement, a pole truck frame, a steering pole, an upright axle pivoted in said frame, said axle having a horizontal rearwardly directed portion, a cross axle bearing a pair of steering wheels, and a support for said cross axle having a bearing portion at right angles thereto for receiving the horizontal portion of said upright axle to provide for lateral oscillation of said cross axle.

7. In a wheeled implement, an upright axle pivoted thereto, a steering pole having a pivotal connection with said implement at a point offset in one direction from the first mentioned pivot, and a pivotal connection between said axle and said pole offset in the opposite direction from the first pivot.

8. In a wheeled implement, a pole truck frame having an axle bearing sleeve thereon, an upright axle received in said sleeve bearing a steering wheel, said sleeve having a pair of arms rigid therewith extending forwardly and rearwardly therefrom, a steering pole for said implement, a yoke having connection with said pole and pivotally mounted on one of said arms, and a crank arm on said upright axle having connection with said yoke adjacent the other of said arms, said connection being detachable at said crank arm to permit the rigid attachment of said yoke with said last mentioned arm.

9. In a wheeled implement, a pole truck frame having an axle bearing sleeve thereon, an upright axle received in said sleeve bearing a steering wheel, said sleeve having an arm extending therefrom to provide an offset pivot point, a yoke extending about said sleeve pivotally connected with said arm at said point, a steering pole having connection with said yoke, and a crank arm on said upright axle offset in the opposite direction from said first mentioned arm and having connection with said yoke.

10. In a wheeled implement, a pole truck frame, a steering pole having pivotal connection therewith, a pivoted steering wheel eccentrically arranged with respect to said first pivot, and means for connecting said steering wheel and pole to swing together with the steering wheel swinging through a greater angle for a given angular movement of said pole, said means serving to limit the swinging movement of said pole and wheel relative to the frame.

11. In an implement having a pair of laterally spaced main wheels and a forward centrally arranged pole truck wheel, a steering pole pivotally connected with said implement, and means providing a steering connection between said truck wheel and said pole whereby the former swings faster than the latter and whereby the swinging movement of the former with the latter is limited to such a degree that said pole truck wheel at the limit of its movement is arranged to move about either one of said main wheels as a center.

12. In an implement having a pair of laterally spaced main wheels and a forward centrally arranged pole truck wheel, a steering pole pivotally connected with said implement, and means providing a steering connection between said truck wheel and said pole whereby the former swings faster than the latter and whereby the swinging movement of the former with the latter is limited, said means providing for the detachability of said pole truck wheel from steering connection with said pole to operate as a caster.

In witness of the foregoing I affix my signature.

HARRY R. TRAPHAGEN.

CERTIFICATE OF CORRECTION.

Patent No. 1,649,757. Granted November 15, 1927, to

HARRY R. TRAPHAGEN.

It is hereby certified that error appears in the printed specification of the above numbered patent requiring correction as follows: Page 2, line 114, claim 2, strike out the word "pivoted"; page 3, lines 10 and 11, claim 4, strike out the word "pivotally"; and that the said Letters Patent should be read with these corrections therein that the same may conform to the record of the case in the Patent Office.

Signed and sealed this 27th day of December, A. D. 1927.

Seal.

M. J. Moore,
Acting Commissioner of Patents.